(12) United States Patent
Cardy

(10) Patent No.: US 11,710,015 B2
(45) Date of Patent: Jul. 25, 2023

(54) SYSTEMS AND METHODS FOR PLANNING AND PRODUCING IMAGES USING PLANTS

(71) Applicant: Global Graphics Software Limited, Cambridge (GB)

(72) Inventor: Andrew Cardy, Eye (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 431 days.

(21) Appl. No.: 16/986,027

(22) Filed: Aug. 5, 2020

(65) Prior Publication Data

US 2022/0044084 A1 Feb. 10, 2022

(51) Int. Cl.
| | | |
|---|---|---|
| G06K 15/02 | (2006.01) | |
| H04W 4/02 | (2018.01) | |
| A01C 7/20 | (2006.01) | |
| A01C 7/10 | (2006.01) | |
| A01C 7/00 | (2006.01) | |

(52) U.S. Cl.
CPC .......... *G06K 15/1836* (2013.01); *A01C 7/006* (2013.01); *A01C 7/10* (2013.01); *A01C 7/102* (2013.01); *A01C 7/105* (2013.01); *A01C 7/20* (2013.01); *G06K 15/188* (2013.01); *H04W 4/025* (2013.01)

(58) Field of Classification Search
CPC .......... A01C 7/006; A01C 7/10; A01C 7/102; A01C 7/105; A01C 7/00; A01C 7/08; A01C 7/20; G06K 15/1836; G06K 15/1835; G06K 15/18; G06K 15/02; G06K 15/00; G06K 15/188; G06K 15/1878; G06K 15/1872; G06K 15/1867; H04W 4/025; H04W 4/02; H04W 4/00
See application file for complete search history.

(56) References Cited

U.S. PATENT DOCUMENTS

| | | | | |
|---|---|---|---|---|
| 4,280,143 A | * | 7/1981 | Judd | ................ G06T 3/40 358/426.14 |
| 6,941,225 B2 | | 9/2005 | Upadhyaya et al. | |
| 2018/0308223 A1 | * | 10/2018 | Zeng | ................ G06T 5/005 |

FOREIGN PATENT DOCUMENTS

| | | | | |
|---|---|---|---|---|
| AU | 2007286751 A1 * | 3/2009 | ........... | A01C 15/006 |
| CN | 107480706 A * | 12/2017 | ........... | G06K 9/6224 |
| CN | 110795516 A * | 2/2020 | ........... | G06F 16/29 |
| EP | 0012173 A1 * | 6/1980 | ........... | H04N 1/38 |
| WO | WO-2019018250 A1 * | 1/2019 | ........... | A01K 97/06 |

OTHER PUBLICATIONS

Bliss, J. (2018). Challenger to Watch: Bulb Energy. Retrieved from The Challenger Project: https://thechallengerproject.com/blog/2018/challenger-brand-to-watch-bulb-energy.
Bonnel, A. (Apr. 2, 2015). Consumer Attitudes Toward Green Brands Reach All-Time High. Retrieved from Market Research: https://blog.marketresearch.com/sustainability-in-america-consumer-attitudes-toward-green-brands-reach-all-time-high.

(Continued)

*Primary Examiner* — Christopher J. Novosad
(74) *Attorney, Agent, or Firm* — Branch Partners PLLC; Bruce E. Black

(57) ABSTRACT

A method and system for producing a plant-based image includes receiving a source image; screening the source image into a set of picture elements; and producing raster data indicating at least a type or density of seeds or plants to plant for each picture element.

20 Claims, 3 Drawing Sheets

(56) References Cited

OTHER PUBLICATIONS

Defra. (2019, 07 18). BPS 2019. Retrieved from Gov.uk: https://assets.publishing.service.gov.uk/government/uploads/system/uploads/attachment_data/file/814208/BPS_2019_scheme_rules_v2.0.pdf.

Lawhorn, C. (Jul. 13, 2018). Town Talk. Retrieved from Lawrence Journal-World: http://www2.ljworld.com/weblogs/town_talk/2018/jul/13/lawrence-is-the-site-of-country-music-superstar-art-thanks-to-local-artist/.

Rosenberg, E. (Dec. 5, 2018). How Google Makes Money. Retrieved from Investopedia: https://www.investopedia.com/articles/investing/020515/business-google.asp.

Suki, N. M. (Aug. 27, 2016). Green product purchase intention: impact of green brands, attitude, and knowledge. Retrieved from Emerald Insight: https://www.emeraldinsight.com/doi/abs/10.1108/BFJ-06-2016-0295.

Wikipedia. (2018). List of busiest airports by passenger traffic. Retrieved from Wikipedia: https://en.wikipedia.org/wiki/List_of_busiest_airports_by_passenger_traffic.

* cited by examiner

SYSTEMS AND METHODS FOR PLANNING AND PRODUCING IMAGES USING PLANTS

FIELD

The invention relates to systems and method for planning producing images using plants. The invention also relates to systems and methods for using screened image data to plan and produce images using plants.

BACKGROUND

Advertising is a large and important industry. Advertising can be found in all walks of life, but new forms of advertising may capture the imagination, and therefore focus of a target audience. Plant-based images have been used in advertising, as well as for corn or maize mazes or works of art of the like, but current methods for creating these images can be labor-intensive. In July 2018, and artist was commissioned by Spotify to create a picture of a recording artist out of a field of crops. This was a painstaking labor which consisted of "34 days in a row of work with just two mornings off" according to sources. It also used a large amount of weed killer

BRIEF SUMMARY

One embodiment is a method for producing a plant-based image. The method includes receiving a source image; screening the source image into a set of picture elements; and producing raster data indicating at least a type or density of seeds or plants to plant for each picture element.

In at least some embodiments, the method further includes providing the raster data to a planter or to planting equipment; and using the raster data to plant seeds or plants at a location according to the raster data. In at least some embodiments, using the raster data includes selecting at least one hopper from a plurality of hoppers to plant the seeds or plants at a particular region at the location according to the raster data.

In at least some embodiments, the method further includes receiving information for the screening, the information including at least one of soil composition, soil type, or soil color. In at least some embodiments, the method further includes receiving information for the screening, the information including at least one of a set of available plants or seeds or a selection of plants or seeds for use in producing the plant-based image. In at least some embodiments, the method further includes receiving information for the screening, the information including a location for the plant-based image and at least one of rainfall, irrigation, or watering equipment at the location.

In at least some embodiments, the screening includes converting the source image into a grey-scale or green-scale image. In at least some embodiments, the screening includes using larger or smaller foliage plants to provide higher or lower density, respectively, in the plant-based image. In at least some embodiments, providing raster data includes providing a GPS location for each of the picture elements.

Another embodiment is a system for producing a plant-based image. The system includes one or more memory devices that store instructions; and one or more processor devices that execute the stored instructions to perform actions, the actions including: receiving a source image; screening the source image into a set of picture elements; and producing raster data indicating at least a type or density of seeds or plants to plant for each picture element.

In at least some embodiments, the actions further include providing the raster data to a planter or to planting equipment. In at least some embodiments, the system further includes the planting equipment configured to plant seeds or plants at a location according to the raster data when the raster data is provided to the planting equipment. In at least some embodiments, the planting equipment is configured to use the raster data to select at least one hopper from a plurality of hoppers to plant the seeds or plants at a particular region at the location according to the raster data. In at least some embodiments, providing raster data includes providing a GPS location for each of the picture elements.

Yet another embodiment is a non-transitory computer-readable medium having stored thereon instructions for execution by a processor to produce a plant-based image, the instructions including: receiving a source image; screening the source image into a set of picture elements; and producing raster data indicating at least a type or density of seeds or plants to plant for each picture element.

In at least some embodiments, the instructions further include receiving information for the screening, the information including at least one of soil composition, soil type, or soil color. In at least some embodiments, the instructions further include receiving information for the screening, the information including at least one of a set of available plants or seeds or a selection of plants or seeds for use in producing the plant-based image. In at least some embodiments, the instructions further include receiving information for the screening, the information including a location for the plant-based image and at least one of rainfall, irrigation, or watering equipment at the location.

In at least some embodiments, the screening includes converting the source image into a grey-scale or green-scale image. In at least some embodiments, providing raster data includes providing a GPS location for each of the picture elements.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The invention relates to systems and method for planning producing images using plants. The invention also relates to systems and methods for using screened image data to plan and produce images using plants.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment, or an embodiment combining software and hardware aspects. The following detailed description is, therefore, not to be taken in a limiting sense. The methods described herein can be performed using any type of processor and any suitable type of device that includes a processor.

Figure 1A:
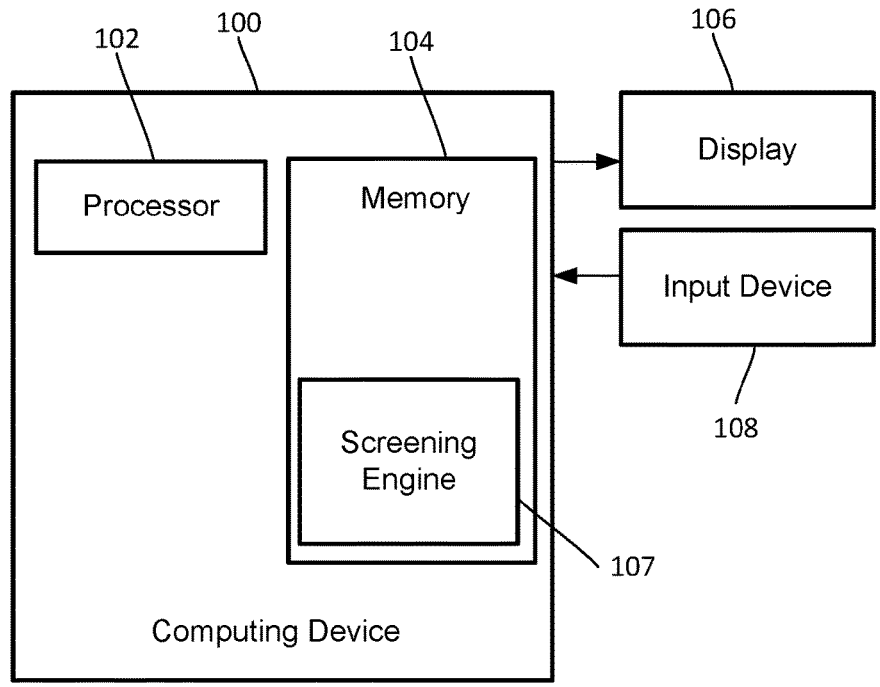
FIG. 1A is a schematic representation of one embodiment of a computing device or system for producing a plant-based image, according to the invention.

FIG. 1A illustrates one embodiment of a computing device 100 which can be used for producing plant-based images (or instructions for producing a plant-based image) from a source image or other purposes. The computing device 100 includes a processor 102 and a memory 104 and can be attached to one or more of an optional display 106 or an optional input device 108.

The computing device 100 can be, for example, a laptop computer, desktop computer, tablet, mobile device, smartphone or any other device that can run applications or programs, or any other suitable device for processing information. The computing device 100 can be entirely local to the user or can include components that are non-local to the user including one or both of the processor 102 or memory 104 (or portions thereof). For example, in some embodiments, the user may operate a terminal that is connected to a non-local computer. In some embodiments, the memory can be non-local to the user.

The computing device 100 can utilize any suitable processor 102 including one or more hardware processors that may be local to the user or non-local to the user or other components of the computing device. The processor 102 is configured to execute instructions provided to the processor.

Any suitable memory 104 can be used for the computing device 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The memory 104 includes instructions that can be executed in the processor 102. The memory may also include instructions that constitute a variety of different software engines. For example, the memory 104 can include a screening engine 107, which is described in more detail below. In at least some embodiments, this engine may be referred to as a module or logic.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Figure 1B:
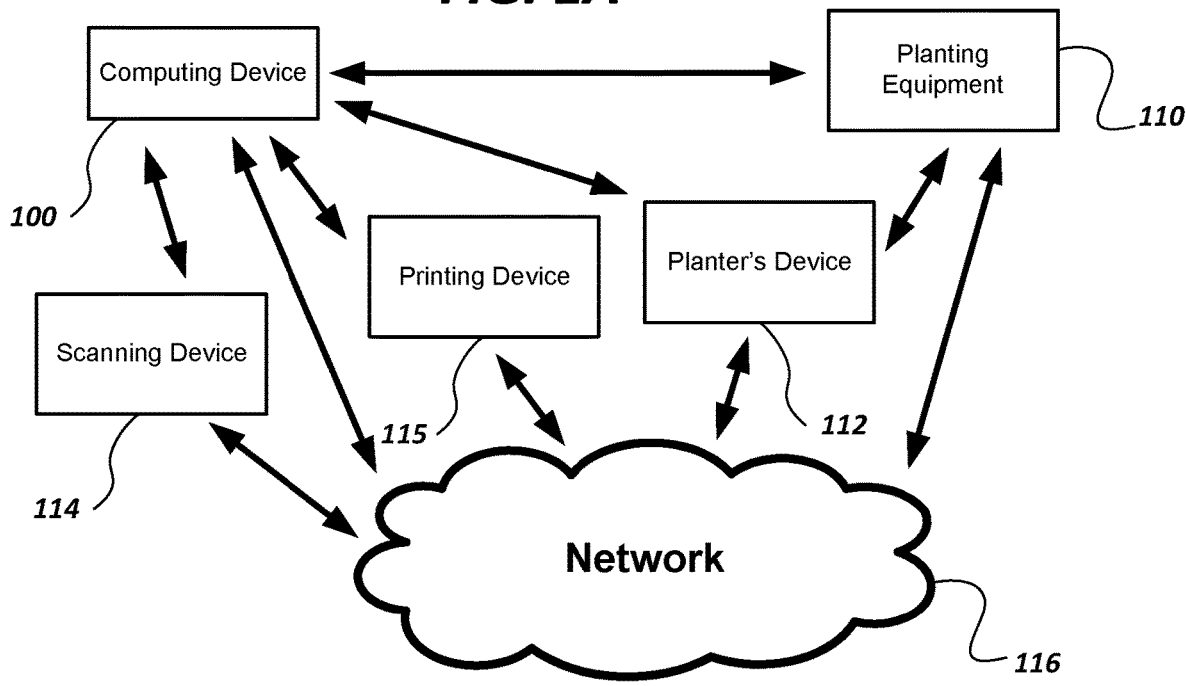
FIG. 1B is a schematic representation of one embodiment of an environment in which the invention can be employed.

FIG. 1B illustrates one embodiment of an environment for the systems and methods described herein. The environment includes a computing device 100, planting equipment 110, a planter's device 112, a scanning device 112, and a printing device 115. It will be understood that two or more of these devices may be combined in a single physical device. In some embodiments, the computing device and either the planter's device 112 or the planting equipment 110 (or both) can be the same device. It will also be understood that any of the devices may be actually multiple devices, such as multiple computing devices 100 or multiple planting equipment 110. It will also be understood that an environment may include more or fewer devices than those illustrated in FIG. 1B.

In at least some embodiments, the environment also includes a network 116 that can be a local area network, a wide area network, the Internet, or any combination thereof. It will also be understood that the network can include devices, other than those illustrated, coupled to the network and that there may be multiple devices of each type illustrated connected to the network. The computing device 100, printing device 115, and scanning device 114 can be directly coupled to each other can be coupled through the network 116 or through one or more other devices (e.g., computers, workstations, servers, or the like).

The scanning device 114 can be any suitable device for scanning images such as an optical scanner, camera system, spectrophotometric system, quality control system, photodiode, or photodiode array. The printing device 115 can be a printing press, printer, or the like and can be an inkjet printing device, thermal printing device, or any other suitable printing device.

The planter's device 102 can be a computer, tablet, workstation, server, mobile device, or any other suitable device that can process instructions or receive information from the computing device 100. The planting equipment 110 can be any suitable equipment for planting seeds or plants or assisting in the planting of seeds or plants or the care of plants such as, but not limited to, a tractor, a planter, a seeder, a seed drill, a grain drill, a plow, a cultivator, a transplanter, a mower, a harvester, or the like or any combination thereof.

Plant-based images can be used to produce landscape-level advertising, corn or maize mazes, works of art, or the like. As an example, advertising on a landscape level using a plant-based image can have benefits over traditional advertising. Firstly, it may be more accessible and may be immediately obvious to viewers. Areas near or around airports may provide excellent sites for such advertisements given that airports may have a large amount of land that can't be otherwise used, and some airports have upwards of 100 million passengers per year, many of whom will look at this land as they land or take-off.

It's also possible that advertising through plants and landscape may allow advertisements to be placed in places where they otherwise would be prohibited, difficult, or ineffective. These could include, for example, alongside roads, on building roofs, public parks, roundabouts, or airports. Advertising using plants may also be of interest to companies as advertising using sustainable and 'green' materials may allow companies to better market their products.

Plant-based images, such as landscape-level advertising, can be designed using plants and open spaces. As described herein, a scalable system and method can be used to create plant-based images, such as landscape-level advisements, corn or maize mazes, works of art, or the like. In at least some embodiments, the method can be as easy as if the field was being sown for a normal annual crop.

Previously, weed killer or other chemicals have been used to create plant-based images. In at least some embodiments, the methods or systems described herein avoid the use of weed killer or similar chemicals or chemical treatments which can be better for the environment.

In at least some embodiments, aside from advertising, the methods and systems described herein can be used in place of any activity that would use weed killer or the ploughing of unwanted crops. In at least some embodiments, the methods and systems simply avoid planting seeds where they are not needed.

As indicated above, the methods and systems can be used to create "Maize Mazes" or "Corn Mazes". Currently, these mazes have become a popular supplemental income option for farmers, some creating up to $50,000 revenue annually. A common current method of creation is to sow the whole field, then destroy the crop that's no longer required as determined, for example, by GPS. This means that the destroyed crop need not have been planted in the first place.

In at least some embodiments, a plant-based image can be designed by an artist, illustrator, or the like. In at least some embodiments, these designs can be relatively elaborate and may, for example, use different colors to map to different seed or plant types. In at least some embodiments, a gradient (for example, a mixture of seeds or plants with differing relative amounts of those seeds or plants) can provide for a fade between two types of plants.

In at least some embodiments, the seeds can be planted at different depths, allowing the plant-based image, such as a maze, to change over time as the plants grow. In at least some embodiments, seeds or plants with different growing cycles can be planted to allow the plant-based image to change over time. This could entice visitors at different times of the year as the maze changes.

Another area where these methods or systems can be used is on farmland which is being left fallow. Farmers are often encouraged to leave land fallow, meaning that they do not cultivate that land during the year. Instead, they can sow wild bird seed mixes or nectar sources or pollen sources or the like or any combination thereof. If these seed mixes or nectar/pollen crops are sown using the methods or systems described herein, a plant-based image, such as an advertisement or other type of attraction, can be produce and could provide an additional income to the farmer, above any governmental payments for their fallow land. This could bring fallow land income closer inline to a full crop.

In at least some embodiments, a system and method can receive a source or input image (optionally with a wide color gamut) and convert that image into data which could be used to reproduce the image on a larger scale using plants.

Figure 2:
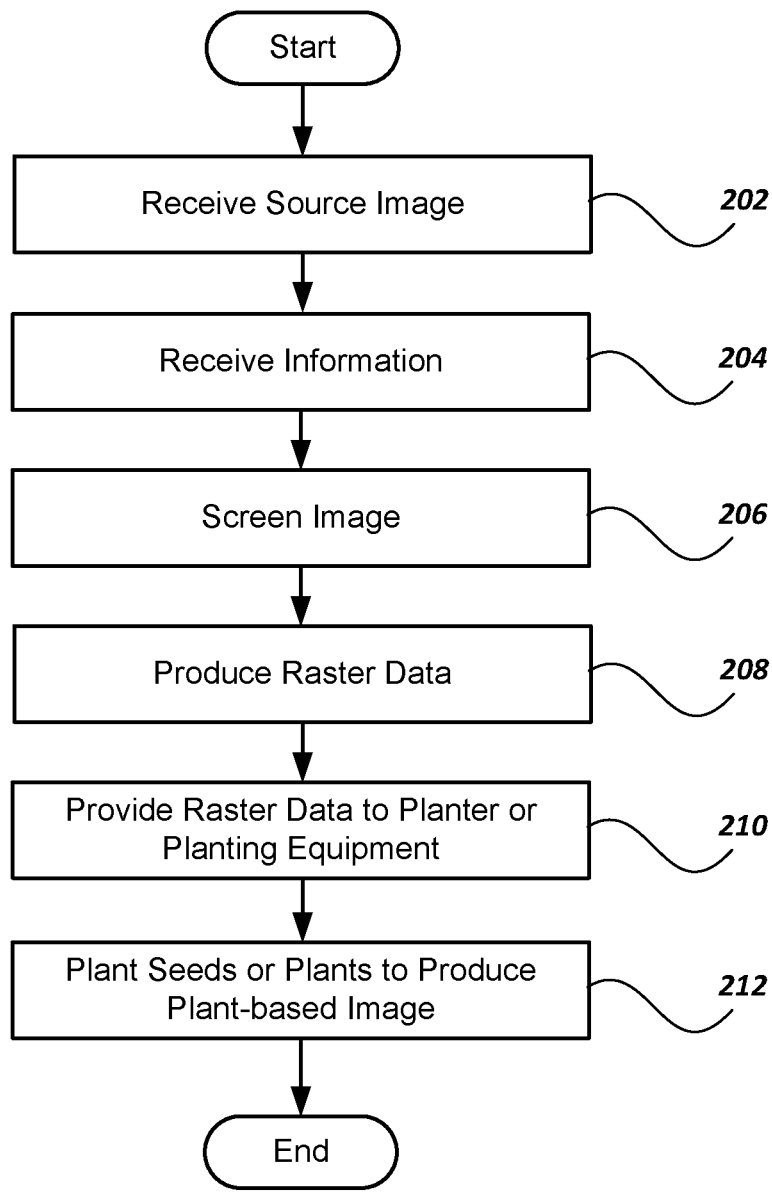
FIG. 2 is a flowchart of one embodiment of a method for producing a plant-based image, according to the invention.

FIG. 2 illustrates one embodiment of a method or system for producing a plant-based image, such as a landscape-level advertisement, corn or maize maze, work of art, or the like using, for example, the system of FIG. 1A. It will be understood that at least some of the steps of the method can be performed in a different order. For example, step 204 can be performed before or after steps 202 or 206. In at least some other embodiments, more or fewer steps may be used.

In step 202, a source image is received. The source image can be in any suitable format including, but not limited to, TIFF, PNG, JPEG, GIF, or any other suitable format. In at least some embodiments, the source image can be provided through, using, or in a page description language (PDL) such as, pdf, xps, or the like and, at least in some embodiments, can be provided to a raster image processor (RIP) to convert the source image to another format.

In step 204, information related to the location, the plants to be used, or any combination thereof is received. This information can be, but is not limited to, one or more of the following: the geographic description or GPS or other coordinates of the location; the size of the location where the plant-based image is to be displayed; the date, range of dates, month(s), or season(s) when the plant-based image is to be displayed; properties of the location such as soil properties (for example, soil color, soil composition, soil type, or the like), climate properties (for example, typical temperatures, rainfall, or the like), weather forecasts, hours of sunlight, irrigation or other watering methods at the location, contours of, or changes in, elevation at the location (for example, a topographic map or survey), or the like or any combination thereof; available, or a selection of available, plants or seeds for use in producing the plant-based image; typical growth times at (or in the general area of) the location for the available or selection of plants; or the like or any combination thereof. In some embodiments, the system may permit a user to input some or all of this information or allow the user to select from one or more menus containing possible responses. In at least some embodiments, some or all of the information may be provided in a file sent to, or otherwise obtained by, the system.

In step 206, the source image is screened using any suitable screening technique to divide the source image into a set of picture elements or pixels. In at least some embodiments, the number or size of the pixels can be selected by the user. Each pixel will correspond to a different region at the location where the plant-based image is to be displayed.

The creation of the data for reproducing the source image into a plant-based image at the location can use a process similar to that used in the printing industry, known as screening or half toning. In many conventional printing methods, screening takes a source image (optionally, with a wide color gamut) and creates as output raster data in a format which determines the position and size of droplets of ink required by the printer to recreate the source image. Instead of the output raster data and format controlling droplets of ink on a printer, in the methods and systems described herein screening can determine elements of the raster data such as, but not limited to, one or more of the following: the location or other identification of the picture element; which plant/seed to plant; the density of plant/seed planting; the depth of seed planting; or the like or any combination thereof. It will be understood that, unless otherwise indicated, reference to plants or seeds can include bulbs, starts, spores, or the like.

For example, in at least some embodiments, screening may include the selection of plants/seeds to reproduce colors in the source image according to the flower or foliage colors of the respective plants/seeds and, at least in some embodiments, the color of the soil or ground or possibly rocks or other elements (for example, plastic or wood elements) added to the location. In at least some embodiments, screening may include using larger or smaller foliage plants to correspond to larger or smaller drop sizes. (This may be analogous to amplitude modulation (AM) screening in the printing industry.) In at least some embodiments, screening may include using higher or lower density of plants/seeds to correspond to larger or smaller drop sizes. (This may be analogous to frequency modulation (FM) screening in the printing industry.) In at least some embodiments, planting the seeds at different depths may allow the image to change over time as the plants/seeds grow. In at least some embodiments, planting mixtures of different seeds/plants may allow the image to change over time or provide a variation in color or allow or provide blending or fading between regions of different colors.

In at least some embodiments, the screening process and raster data output may be adjusted based on the soil color or other properties of the soil. For example, adjustments may be made to ensure the final plant-based reproduction would look correct taking into account the soil color that may be seen behind the plants or between the plants or in regions that are devoid of plants. This can be analogous to taking into account the substrate that is being printed on in conventional printing methods and systems.

In at least some embodiments, screening may include converting a color image into a grey-scale (or "green-scale" where the image is presented in different shades of green) image. Such conversion may include the color of the bare soil or ground, as well as different shades of green, yellow, or other foliage colors (for example, red or brown) from different plants. The density of the plants may also influence color. In at least some embodiments, including the colors of plant flowers may be increase the color palette available for the plant-based image, although reliance on flowers may limit or reduce the longevity of the plant-based image.

In step 208, the screening process produces raster data. In at least some embodiments, the raster data can be provided or wrapped in an image format, so that the raster data can be inspected by displaying the raster data before planting. In at least some embodiments, the raster data may be used to simulate or display how the crop may look over the growing season, as it passes through different phases of growth.

The raster data can include a location for the picture element and at least a type or density of seeds or plants to plant. In at least some embodiments, the raster data can include a GPS or other location information used for determining the position of the machinery (for example, a tractor) to plant the seeds/plants.

In step 210, the raster data is provided to a planter (or planter's device) or to planting equipment. In at least some embodiments, the computing device used for steps 202 to 208 may be the planter's device or planting equipment.

In step 212, the plants or seeds are planted to produce the plant-based image is produced according to the raster data. The plants or seeds are planted based on the raster data. In at least some embodiments, this planting may be performed by programming the planting equipment according to the raster data or may be performed by a planter using the planter's device to operate the planting equipment and plant the seeds or plants according to the raster data.

In addition to the planting of plants or seeds, the production of the plant-based image may include the mowing or harvesting of some of the plants after a period of plant growth.

Figure 3:
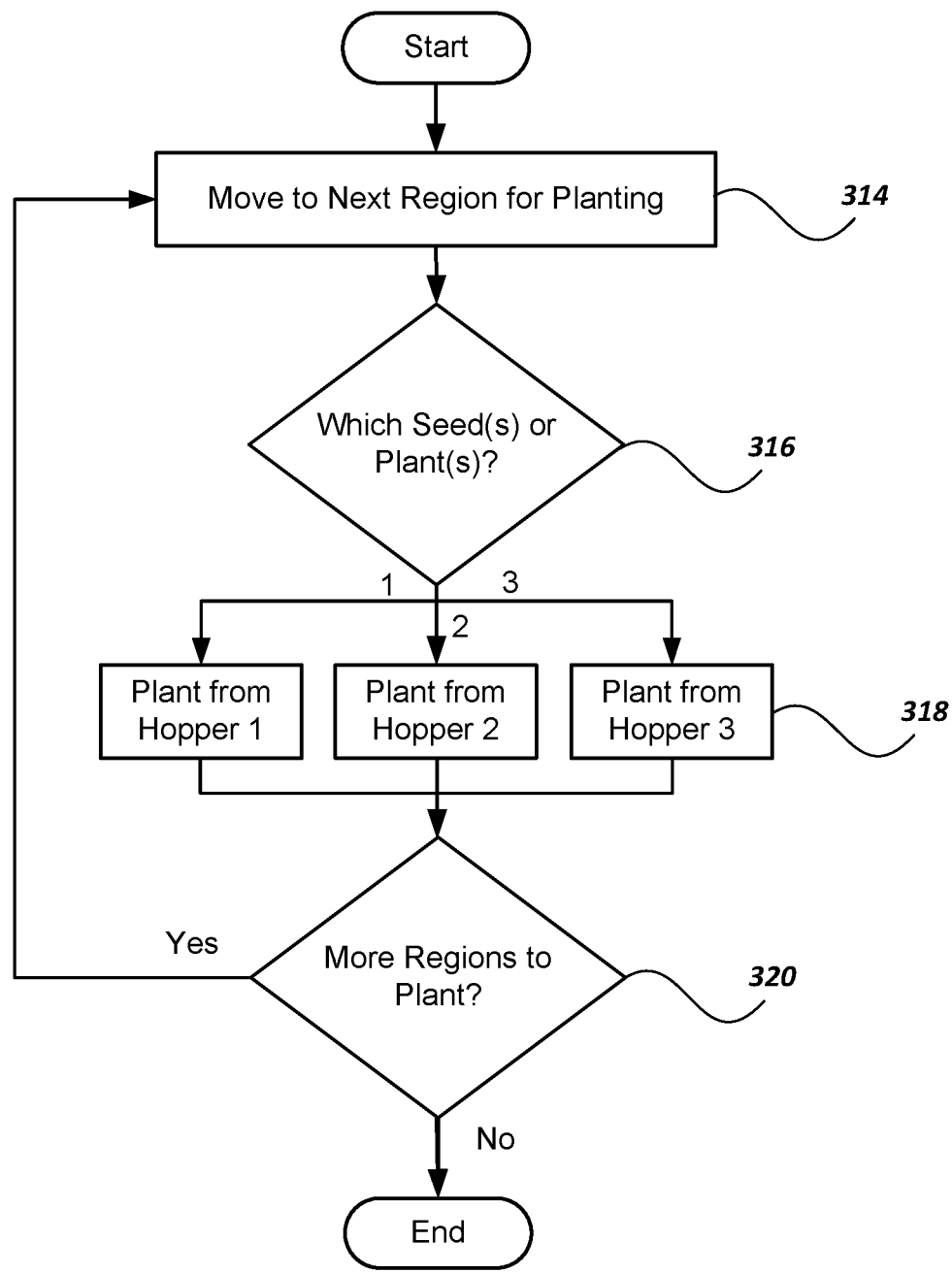
FIG. 3 is a flowchart of one embodiment of a method for planting plants or seeds for producing a plant-based image, according to the invention.

FIG. 3 illustrates one method or system of planting seeds or plants according to the raster data. In step 314, the planter or planting equipment is moved to the next region for planting. The region corresponds to a picture element in the raster data. In at least some embodiments, the location of the region may be determined using GPS or other locating methods or techniques.

In step 316, it is determined which seed(s) or plant(s) to plant in step 318. In step 318, an example with three different seeds or plants in three different hoppers (Hopper 1, Hopper 2, and Hopper 3) is provided. It will be recognized that any number of hoppers can be used. The hopper(s) are selected based on the raster data. In at least some embodiments, only one type of seed or plant is planted at each region. In at least some embodiments, there may be regions in which two or more types of plants or seeds are planted (for example, plants or seeds from both Hopper 1 and Hopper 2). In at least some embodiments, the raster data may also specify a density of seeds or plants which may control the flow rate out of the individual hoppers.

In at least some embodiments, the region may be a relatively small region that can be planted quickly (within 1 minute or less) before moving to the next region. In other embodiments, the region may be larger and planted over a longer period of time (for example, 2, 5, 10 minutes or more.) In at least some embodiments, only a portion of the region is planted before moving to another region. The remainder of the region can then be planted later.

In step 320, it is determined whether more regions are to be planted. If so, the method or system returns to step 314. In not, then the method or system ends.

It will be understood that each block of the flowchart illustration, and combinations of blocks in the flowchart illustration and methods disclosed herein, can be implemented by computer program instructions. These program instructions may be provided to a processor to produce a machine or engine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computing device. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

The above specification and examples provide a description of the invention. Since many embodiments of the invention can be made without departing from the spirit and scope of the invention, the invention also resides in the claims hereinafter appended.

What is claimed as new and desired to be protected by Letters Patent of the United States is:

1. A method for producing a plant-based image, the method comprising:
   receiving a source image;
   screening the source image into a set of picture elements; and producing raster data indicating, for each picture element, at least a type or density of seeds or plants to plant at corresponding locations on a site to produce a plant-based image at the site that reproduces the source image using the plants that are planted, or that grow from the seeds that are planted, at the corresponding locations on the site.

2. The method of claim 1, further comprising
providing the raster data to a planter or to planting equipment; and
using the raster data to plant seeds or plants at the corresponding locations on the site according to the raster data.

3. The method of claim 2, wherein using the raster data comprises selecting at least one hopper from a plurality of hoppers to plant the seeds or plants at the corresponding locations at the site according to the raster data.

4. The method of claim 1, further comprising receiving information for the screening, the information comprising at least one of soil composition, soil type, or soil color.

5. The method of claim 1, further comprising receiving information for the screening, the information comprising at least one of a set of available plants or seeds or a selection of plants or seeds for use in producing the plant-based image that reproduces the source image.

6. The method of claim 1, further comprising receiving information for the screening, the information comprising the site for the plant-based image and at least one of rainfall, irrigation, or watering equipment at the site.

7. The method of claim 1, wherein the screening comprises converting the source image into a grey-scale or green-scale image.

8. The method of claim 1, wherein the screening comprises using larger or smaller foliage plants to provide higher or lower density, respectively, in the plant-based image that reproduces the source image.

9. The method of claim 1, wherein providing raster data comprises providing a GPS location for the corresponding locations, corresponding to each of the picture elements, for the site of the plant-based image that reproduces the source image.

10. A system for producing a plant-based image, the system comprising:
one or more memory devices that store instructions; and
one or more processor devices that execute the stored instructions to perform actions, the actions comprising the method of claim 1.

11. The system of claim 10, wherein the actions further comprise providing the raster data to a planter or to planting equipment.

12. The system of claim 11, wherein the system further comprises the planting equipment configured to plant seeds or plants at the corresponding locations on the site according to the raster data when the raster data is provided to the planting equipment.

13. The system of claim 12, wherein the planting equipment is configured to use the raster data to select at least one hopper from a plurality of hoppers to plant the seeds or plants at the corresponding locations at the site according to the raster data.

14. The system of claim 10, wherein providing raster data comprises providing a GPS location for each of the corresponding locations, corresponding to each of the picture elements, for the site of the plant-based image that reproduces the source image.

15. A non-transitory computer-readable medium having stored thereon instructions for execution by a processor to produce a plant-based image, the instructions comprising actions, the actions comprising the method of claim 1.

16. The non-transitory computer-readable medium of claim 15, wherein the instructions further comprise receiving information for the screening, the information comprising at least one of soil composition, soil type, or soil color.

17. The non-transitory computer-readable medium of claim 15, wherein the instructions further comprise receiving information for the screening, the information comprising at least one of a set of available plants or seeds or a selection of plants or seeds for use in producing the plant-based image that reproduces the source image.

18. The non-transitory computer-readable medium of claim 15, wherein the instructions further comprise receiving information for the screening, the information comprising the site for the plant-based image and at least one of rainfall, irrigation, or watering equipment at the site.

19. The non-transitory computer-readable medium of claim 15, wherein the screening comprises converting the source image into a grey-scale or green-scale image.

20. The non-transitory computer-readable medium of claim 15, wherein providing raster data comprises providing a GPS location for each of the corresponding locations, corresponding to each of the picture elements, for the site of the plant-based image that reproduces the source image.

* * * * *